US006166508A

United States Patent [19]

Kalb

[11] Patent Number: 6,166,508

[45] Date of Patent: Dec. 26, 2000

[54] PROCESS FOR CONTROLLING THE DISPLACEMENT OF THE WINDOW PANE OF A MOTOR VEHICLE DOOR

[75] Inventor: Roland Kalb, Rossach, Germany

[73] Assignee: Brose Fahrzeugteile GmbH & Co. KG, Coburg, Germany

[21] Appl. No.: 09/214,983

[22] PCT Filed: Jul. 30, 1997

[86] PCT No.: PCT/DE97/01668

§ 371 Date: Jan. 15, 1999

§ 102(e) Date: Jan. 15, 1999

[87] PCT Pub. No.: WO98/07079

PCT Pub. Date: Feb. 19, 1998

[30] Foreign Application Priority Data

Aug. 9, 1996 [DE] Germany ........................... 196 32 139

[51] Int. Cl.$^{7}$ ............................. G05B 19/404; B60J 1/12

[52] U.S. Cl. .......................... 318/632; 318/630; 318/286; 318/468

[58] Field of Search .................................... 318/630, 632, 318/264, 265, 266, 286, 466, 468

[56] References Cited

U.S. PATENT DOCUMENTS

| | | | |
|---|---|---|---|
| 4,468,596 | 8/1984 | Kinzl et al. | 318/287 |
| 4,571,884 | 2/1986 | Hetmann et al. | 49/72 |
| 4,641,067 | 2/1987 | Iizawa et al. | 318/287 |
| 4,686,598 | 8/1987 | Herr | 361/31 |
| 5,170,108 | 12/1992 | Peterson et al. | 318/469 |
| 5,268,623 | 12/1993 | Muller | 318/434 |
| 5,334,876 | 8/1994 | Washeleski et al. | 307/10.1 |
| 5,399,950 | 3/1995 | Lu et al. | 318/565 |
| 5,410,229 | 4/1995 | Sebastian et al. | 318/434 |
| 5,422,551 | 6/1995 | Takeda et al. | 318/265 |
| 5,483,135 | 1/1996 | Parks | 318/469 |
| 5,521,474 | 5/1996 | Hahn | 318/285 |
| 5,530,329 | 6/1996 | Shigematsu et al. | 318/469 |
| 5,539,290 | 7/1996 | Lu et al. | 318/565 |
| 5,596,253 | 1/1997 | Mizuta et al. | 318/469 |
| 5,640,072 | 6/1997 | Miyazaki et al. | 318/282 |
| 5,682,090 | 10/1997 | Shigematsu et al. | 318/468 |
| 5,740,630 | 4/1998 | Medebach | 49/352 |
| 5,872,436 | 2/1999 | Bergmann et al. | 318/286 |

FOREIGN PATENT DOCUMENTS

| | | |
|---|---|---|
| 0 047 812 A1 | 3/1982 | European Pat. Off. . |
| 0 270 837 A1 | 6/1988 | European Pat. Off. . |
| 0 331 142 B1 | 9/1989 | European Pat. Off. . |
| 30 34 118 A1 | 3/1982 | Germany . |
| 3301071 | 7/1984 | Germany . |
| 33 03 590 C2 | 8/1984 | Germany . |
| 33 46 366 A1 | 7/1985 | Germany . |
| 35 32 078 C2 | 4/1986 | Germany . |
| 35 14 223 A1 | 10/1986 | Germany . |
| 42 14 998 A1 | 11/1993 | Germany . |
| 43 16 898 A1 | 12/1993 | Germany . |

(List continued on next page.)

*Primary Examiner*—Bentsu Ro
*Attorney, Agent, or Firm*—Christie, Parker & Hale, LLP

[57] ABSTRACT

A method for controlling a movement of a window pane of a motor vehicle door immediately after the lowering of the window pane, until there is compensation of the system deficiency of the displacement mechanism caused by the displacement of the window pane into the lowering direction of movement. With a short stroke lowering of the upper edge of a free-standing frameless window pane from a keyed sealing engagement on the bodywork side, a signal is generated through opening of the door and passed to an electronics evaluation unit whereupon the drive of the window lifter is activated in the lowering direction until the window pane has moved from its closed position into a predetermined partially opened position. After closing the vehicle door, as a result of the generation of a further signal, the lowered window pane is automatically closed again. During control of the drive for the purpose of automatically lowering the window pane, a first phase of the drive movement is assigned to compensate the system deficiencies of the window lifting mechanism, and a second phase of the movement is assigned to a path of the window lowering.

8 Claims, 2 Drawing Sheets

FOREIGN PATENT DOCUMENTS

| | | |
|---|---|---|
| 195 11 581 A1 | 10/1995 | Germany . |
| 44 11 300 A1 | 10/1995 | Germany . |
| 195 17 958 A1 | 11/1995 | Germany . |
| 195 14 954 A1 | 12/1995 | Germany . |
| 195 36 207 A1 | 4/1996 | Germany . |
| 195 07 137 A1 | 9/1996 | Germany . |
| 59-045515 | 9/1982 | Japan . |
| 63-101912 | 5/1988 | Japan . |
| 4-126629 | 4/1992 | Japan . |
| 5-254347 | 10/1993 | Japan . |
| WO 97/12108 | 4/1997 | WIPO . |

PROCESS FOR CONTROLLING THE DISPLACEMENT OF THE WINDOW PANE OF A MOTOR VEHICLE DOOR

FIELD OF THE INVENTION

The invention relates to a method for controlling the movement of a window pane of a motor vehicle door, more particularly for the short stroke lowering of the upper edge of the window of a free-standing frameless window pane from a positive locking sealing engagement on the body-work side. It ensures that the position reached by lowering the window pane cannot be changed through extraneous force actions (shaking or pressure of hands resting thereon). With an automatic short stroke lowering, this is an improvement for meeting the existing demands regarding guaranteeing an anti-jam protection.

BACKGROUND OF THE INVENTION

From DE 33 01 071 C2 a device is known for lowering and raising a window pane of a motor vehicle which comprises a switch-on member which becomes active when the door is opened and closed and whose signal is evaluated by a control device. Depending on the voltage which momentarily arises, one of two proposed time switch stages will respond whereby the drive motor is set in motion in the controlled direction for a designated time period dependent on the voltage interval.

The device described serves to lower the upper edge of the window pane from a positive sealing engagement of a sealing element on the body work side. The lowering of the window pane, triggered by the unlocking of the vehicle door, is thereby carried out just so far that the door can be opened without problem. On the other hand through changed conditions, such as increasing the system deficiency of the adjustment device and reducing the operating voltage, there is the danger that the upper edge of the window does not completely leave the sealing area. It is therefore usual up until now to control the drive for a period of time in the lowering direction, which contains an additional time reserve and in each case is adequate for a sufficient lowering of the window pane.

A disadvantage of the prior art is that the requirements for anti-jam protection, more particularly US requirement FMVSS 118 § S 5, can no longer be observed if through the motorized lowering of the window pane there is still a gap existing which exceeds the maximum width of 4 mm. For as a result of the system elasticity and the reverse play of the window lifting mechanism, a person resting on the top edge of the window pane or vibrations can lead to the window lowering further by several millimeters. In these cases the use of a comparatively expensive anti-jam protection would be required in order to obtain an operating permit.

One possibility of avoiding the short stroke lowering of a free-standing frameless window pane lies in using a pure force locking connection between the seal and the edge of the window. However this has the drawback that a high structural expense has to be incurred for guiding and adjusting the window. The large friction forces which are necessary between the edge of the window and the seal create very high closing forces. Furthermore restrictions regarding the aerodynamics in this area have to be taken into account, which causes increased wind noises.

From EP 0 270 837 A1, a method is known for regulating the position of moving parts of NC and CNC machine tools wherein after reaching the ideal position of a component part of the machine tool a reversal signal is produced which changes the direction of rotation of the drive motor. The normal position regulation is stopped and a predetermined resetting value produced which turns the drive motor back by an angle corresponding to the reversal span. This method cannot however be transferred to controlling a window pane in a motor vehicle. For here it is not a question of compensating a predetermined reversal play which is produced through the play of individual gear elements, but it is rather a matter of compensating a system deficiency which can change through extraneous force action and ageing, and is therefore variable.

SUMMARY OF THE INVENTION

The object of the invention is to develop a method for controlling the movement of a window pane of a motor vehicle door which reliably rules out any change in an automatically driven lowered window pane position, even in the event of external forces acting thereon. The method is thereby to compensate automatically any changes in influencing factors such as ageing of the technical system and fluctuations in the operating voltage. In the event of using the method for short stroke lowering, the lowered window position is to be achieved exactly even if the said external influencing factors vary considerably. More particularly it is necessary that a difference is made between the drive movements for compensating the system deficiencies and those for producing a genuine movement of the window.

In order to secure the automatically reached lowered window position immediately after this position is reached, the window lifter drive is steered in the lifting direction until the system deficiency has been compensated by the adjustment mechanism. This means that the drive is switched off before the window starts to rise again. Within the scope of the invention, however, such a lifting movement of the window pane does still exist, but this is much smaller than the window pane stroke available, and amounts, for example, to 1% of the pane stroke.

In order to judge the system state, i.e. whether a system deficiency does or does not exist, a measured value, such as the period length of a drive shaft (e.g. motor shaft) or the current pick-up of the electrical drive, is preferably used. The period length can be simply determined by evaluating echo signals which are generated on an echo element by a magnet fixed on the drive shaft. As long as a system deficiency exists, then the motor turns faster and close to its idling speed which is connected with a comparatively small period length. Under load, thus after compensating for the system deficiency, the motor brakes and the period length is adequately extended. Since the state of an electric motor can be judged very well through the current pick-up, the current strength is also well suited as measured value. The faster the motor turns, the smaller is its current pick-up.

In order to be able to detect with sufficient sharpness the boundary area between drive movements which compensate a system deficiency and drive movements which cause a displacement of the window pane, even with changing influencing factors (e.g. lowering of the operating voltage), the switch-off criterion (boundary value) is generated on the basis of at least a preceding measured value. An electronic filter ensures that not just any small change in the measured value leads to the drive switching off. Only when the measured value to be evaluated deviates from the comparison value by a fixed absolute or proportional relative (percentage) amount does it result in the generation of the switch-off signal.

The window pane is now under mechanical tension in the lifting direction. It will no longer change its position through outside forces as a result of shaking or leaning on the window. With the next control in the lifting direction, the window pane is raised without delay, i.e. without any dead time.

If the invention is to be used for a short stroke lowering of a window pane, then the lowering can be carried out in a similar way to the method of operation described above. To this end the electronic unit evaluates the generated measuring signals during control of the drive in the lowering direction with regard to the system state. As long as a cable slack is detected, the path signals are allocated to no window movement (window travel).

Only after a complete compensation of the system deficiencies are the path signals of the drive evaluated as movement of the window pane. It is thus ensured that the window pane position provided is still reached exactly even if, for example, the system deficiencies have changed considerably as a result of ageing or the operating voltage has changed considerably as a result of an extreme loading or unloading state.

As an alternative to this, the lowered window position can, however, also be set by a limit switch or by measuring marks on the window pane. The path of the automatic window lowering can be measured by direct measurement of the window pane, counting the number of drive shaft revolutions, or using an end switch.

BRIEF DESCRIPTION OF THE DRAWING

The invention will now be explained in further detail with reference to the following drawings.

DETAILED DESCRIPTION OF THE PREFERRED EMBODIMENT

Figure 1:
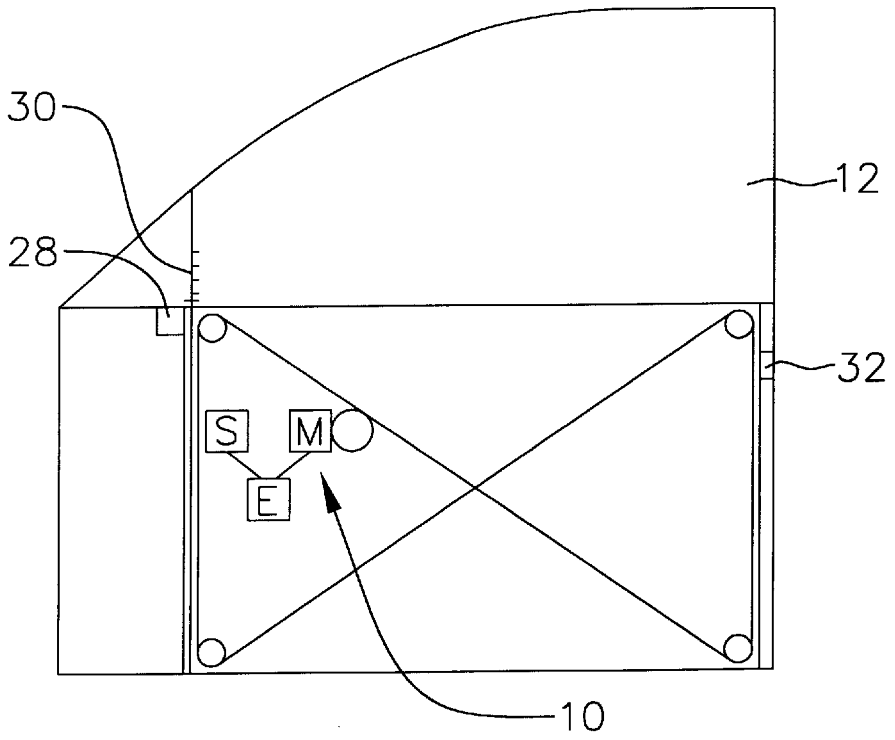
FIG. 1 shows a diagrammatical view of a window lifter system according to the present invention.
Figure 2:
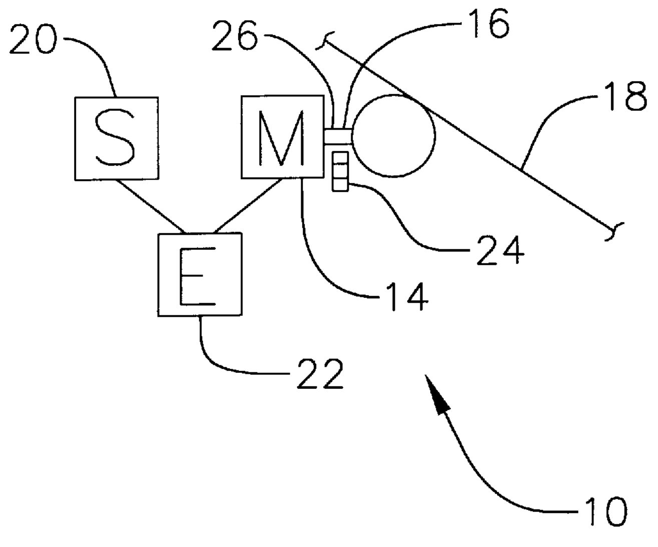
FIG. 2 shows a detailed view of the drive of the window lifter system shown in FIG. 1.

The method of the present invention is performed in connection with an electronically controlled window lifter drive 10 for controlling the movement of a window pane 12 (See FIGS. 1 and 2). Preferably, the window lifter drive 10 includes an electric motor 14 that drives a shaft 16 to move a window cable 18 for window movement. A signal generator 20, preferably a switch, generates a signal, preferably through an opening or closing of the vehicle door. The signal is passed to an electronic evaluation unit 22 whereupon the window lifter drive is activated.

In order to judge the system's state, i.e., whether a system deficiency does or does not exist, a measured value, such as the period length of the drive shaft 16 or the current pick-up of the electrical drive, is used. Period length can be simply determined by evaluating echo signals generated on an echo element 24 by a magnet 26 fixed on the drive shaft 16.

In alternative embodiments, the lowered window position can be set by a measurement element 28 that detects window marks 30 or by an end switch 32.

Figure 3:
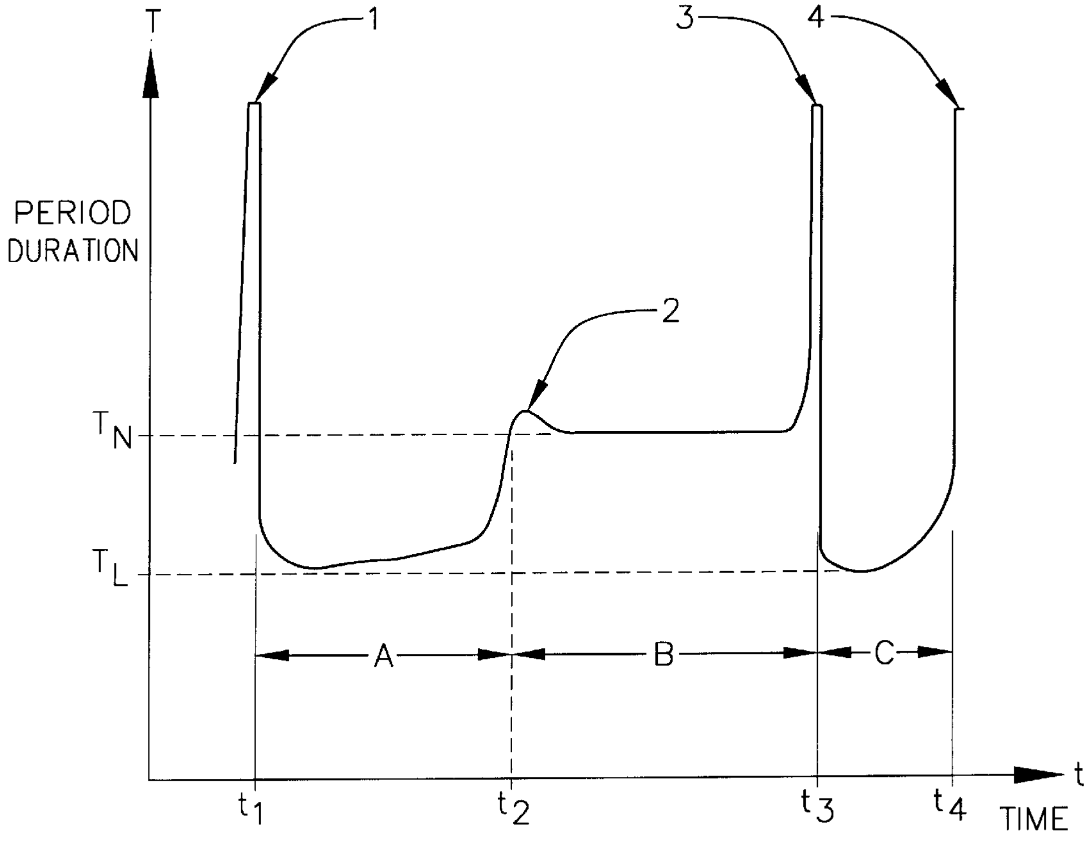
FIG. 3 shows diagrammatically the curve path of a short stroke lowering in the T-t diagram, wherein T is the period length of a drive shaft, more particularly a motor shaft, and t is the time.

The period length-time (T-t) diagram of FIG. 3 is based on a fully closed window pane whose upper edge is pressed into the sealing area by the window lifting device; the window pane is located at rest. At time point $t_1$, the drive of the window lifter is activated in the lowering direction. The control signal required for this can be triggered as a result of opening of the vehicle door by an electrical switch contact which is in active connection, for example, with the lock.

Because this drive movement which is steered in the lowering direction represents a change of rotary direction compared to the previous lifting movement which led to the closing of the window pane, a comparatively large system deficiency exists in the window lifting mechanism. Therefore, a lowering of the window pane is not connected directly with the starting point 1 of the drive in the lowering direction. In a first phase of the drive movement (area A) the system deficiency has first to be compensated. As a result of the lack of mechanical resistance, the drive accelerates in the shortest time up to approximately its idling speed, which corresponds to the idling period length $T_L$.

Shortly before reaching the time point $t_2$, the system deficiency is compensated and the window lifting mechanism starts to tension again but first, however, without causing any movement of the window pane. Point 2 characterizes a local maximum of a typical curved path which represents the transition between adhesive friction and sliding friction of the window pane, which is to be moved, and thus the start of the window lowering. All movement signals generated up to this point by the drive or a drive shaft are associated with the system deficiency. Only the signals of the area B are connected with a movement of the window pane and are evaluated accordingly. The drive levels off at its nominal speed with the period length $T_N$.

The drive movement is stopped when, as a result of the path signals generated in a second phase of the drive movement, i.e., the area B, a fixed path of the window lowering is carried out. Thus the adjustment time between $t_2$ and $t_3$ does not serve as a measure for adjustment since, for example, any change in the operating voltage would lead to undesired deviations in the stroke of the window pane.

In order to secure the window position against lowering, the control electronics at point 3 cause a change in the direction of rotation, which compensates the system deficiency caused by the previous lowering movement. This takes place according to the same principle as already described for compensating the system deficiencies in the lowering direction. With the switching off of the drive at point 4, the system deficiencies of the area C are fully compensated and the window pane is under mechanical tension in the lifting direction.

In order to be able to determine with sufficient accuracy the time point $t_2$ which separates the area A of the system deficiency compensated from the area B of genuine window movement, it is necessary to determine a boundary value of the measured value which describes the system state. The boundary value is preferably calculated on the basis of at least a measured value which has previously been determined, in order to detect with this all the factors (temperature, moisture, ageing, operating voltage) which influence the system. Through an algorithm recorded in the electronics unit it is possible to fix by which absolute or relative amount the next measured value may deviate. On exceeding or understepping (falling below) this value, the system deficiencies are regarded as compensated.

What is claimed is:

1. A method for controlling movement of a window pane of a motor vehicle door by means of a window lifter having an electronically controlled drive with a lowering and a lifting direction, and operated by an extraneous force, the method comprising:

passing control signals of a signal generator to an electronic evaluation unit, whereupon the drive of the window lifter is activated in the lowering direction;

immediately after a lowering of the window pane, controlling the window lifter drive in the lifting direction until a system deficiency of an adjustment mechanism caused by displacement of the window pane in the lowering direction is compensated, so that lifting of the window pane can start.

2. The method according to claim 1 wherein the window pane is a free-standing frameless window pane having an upper edge in positive sealing engagement on the body work side when the window pane is in a closed position, further comprising:

a) generating a signal by the opening of the door, wherein passing control signals includes passing the signal generated by the opening of the door to the electronic evaluation unit whereupon the drive of the window lifter is activated in the lowering direction until the window pane is moved from a closed position into a predetermined partially opened position;

b) during control of the drive, for the purpose of automatically lowering the window pane, assigning a first phase of drive movement to compensate for the system deficiencies of the window lifter mechanism, and assigning a second phase of movement to a path of the window lowering; and c) automatically closing the automatically lowered window pane after closing of the vehicle door, as a result of the generation of a further signal.

3. The method according to claim 1 further comprising regarding the system deficiency as compensated when a boundary value of a measured value reflecting the system state is one of exceeded and understepped.

4. The method according to claim 3 further comprising generating the boundary value from at least one previously determined measured value, wherein the boundary value, deviates from a last measured value by one of a fixed set and a proportional amount.

5. The method according to claim 3 further comprising using a period length of a drive shaft as the measured value.

6. The method according to claim 3 further comprising using a current pick-up or an electronically controlled drive as the measured value.

7. The method according to claim 1 further comprising measuring a path of the automatic window lowering by one of carrying out a direct measurement on the window pane, using the number of drive shaft revolutions as a measure, and using an end switch.

8. The method according to claim 5 wherein the drive shaft is a shaft of an electric motor.

* * * * *